Patented June 30, 1953

2,644,005

UNITED STATES PATENT OFFICE 2,644,005

ORGANIC ARSENICAL COMPOUNDS

Ewald Urbschat, Koln-Mulheim, Germany, assignor to Farbenfabriken Bayer Aktiengesellschaft, Leverkusen, Germany, a corporation of Germany No Drawing. Application February 7, 1950, Serial No. 142,951. In Switzerland February 15, 1949

3 Claims. (Cl. 260—440)

The present invention relates to new organic arsenical compounds and to a process of making the same.

The arsenical compounds according to this invention correspond to the following general formula:

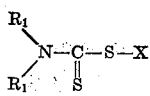

wherein X stands for one of the radicals:

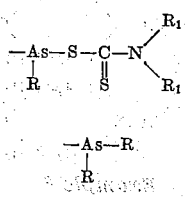

and $-\text{As}-\text{R}$
  $|$
  $\text{R}$ $R_1$ and R stand for organic radicals, and $R_1$ may also be hydrogen. Further the radicals $R_1$ attached to a nitrogen atom as well as the radicals R attached to an arsenic atom may be united including the hetero atom to which they are attached to form a heterocyclic ring system; in this ring formation in addition to nitrogen or arsenic other hetero atoms may take part. As examples for $R_1$ may be mentioned hydrogen, alkyl, aryl, aralkyl and polymethylene chains which may be interrupted by hetero atoms. These polymethylene chains form with nitrogen to which they are attached heterocyclic systems, thus e. g. piperidine, pyrrolidine, morpholine. R may be alkyl, aryl, aralkyl and, in case the arsenic is twice substituted, the radicals R may form—like the radicals $R_1$—a ring including the arsenic atom to which they are attached; also here the heterocyclic system may contain a further hetero atom.

For the manufacture of these new compounds primary or secondary organic compounds of the trivalent arsenic are reacted with dithiocarbamic acids or their salts or their oxidation products. For this purpose solutions or suspensions of substituted arsine oxides or the corresponding halides are reacted with the free dithiocarbamic acids or their salts, or arseno-compounds are fused together with the oxidation products of the dithiocarbamic acids, the thiuram disulfides; the latter reaction may also be effected by heating the components in a suitable diluent. Which of these two methods is preferred in a particular case depends mainly upon the physical properties of the initial materials, chiefly upon their solubility, but also upon the form in which the initial arsine compounds are most easily obtainable, i. e. whether in their manufacture these initial compounds are most easily obtained as oxides, halogen compounds or arseno-compounds. For the manufacture of the new compounds on a technical scale the first mentioned method is best suited using water as solvent; in this case it is most convenient to react the dithiocarbamic acids in statu nascendi set free from the aqueous solutions of their salts in the presence of the solutions or suspensions of the arsinious oxides. The second method is of more limited applicability, since it depends upon the stability of the initial compounds in the fusing. By both methods, however, the end products are obtained in good yield and high purity.

As mentioned above in making the new compounds by the first method water is the most suitable solvent; to dissolve the arsine oxides it is sometimes advisable to add a base such as sodium hydroxide. These solutions can now be mixed with aqueous solutions of salts of dithiocarbamic acids and the mixture run into hydrochloric acid. The aqueous solutions of the arsine oxides may, however, first be acidified and then the aqueous solutions of salts of dithiocarbamic acids run into them. In some instances the use of organic solvents was found to be expedient, thus when starting from the arsine halides. When starting from the halides, of course, the use of acids to set free the dithiocarbamic acids from their salts can be dispensed with.

The new compounds are in many cases distinguished by an excellent crystallizability; they show no irritating effect and, therefore, may be used for various technical purposes. They are particularly suited for the control of plant pests and have the great advantage of possessing not only good insecticidal properties but also good fungicidal properties.

The present invention is illustrated by the following examples; it is, however, not restricted thereto:

*Example 1*

318 grams of methyl arsine oxide dissolved in 5 litres of water are mixed with 6 litres of 1 n-hydrochloric acid. In this solution 860 grams of sodium dimethyl dithiocarbamate dissolved in 7 litres of water are run with vigorous stirring and cooling. Immediately a white precipitate is formed which after half an hour's stirring is sucked off, washed with water and dried in the air. By re-dissolving from acetone glittering crystals are obtained melting at 144° C.

The above-described reaction takes the following course:

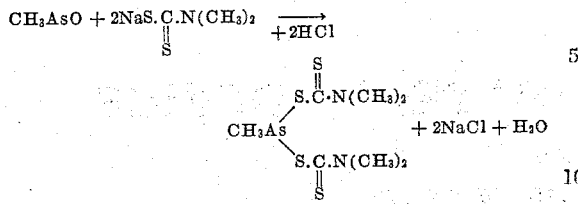

Example 2

168 grams of phenyl arsine oxide are dissolved in 2 litres of n-caustic soda solution under slight heating. Thereafter a solution of 286 grams of sodium dimethyl dithiocarbamate dissolved in 3 litres of water is added. The mixture which is only slightly turbid flows, while stirring, as a thin stream into 4 litres of 1 n-hydrochloric acid diluted with 5 litres of water. After shortly stirring the separated white deposit is sucked off, washed with water and dried in the air. By re-dissolving from acetone fine needles are obtained which discolor towards 215° C. and melt at 221° C.

The above-described reaction takes the following course:

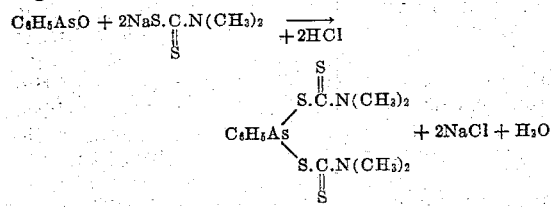

Example 3

30 grams of arsenobenzene and 48 grams of tetramethyl thiuramdisulfide are thoroughly mixed and heated up to 150–160° C. After a short time the pappy melt solidifies. The temperature is maintained for one hour and the solid cake is purified after cooling by re-dissolving from chloroform or chlorobenzene.

The above-described reaction takes the following course:

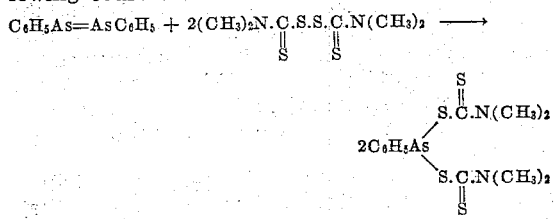

The reaction between arsenobenzene and tetramethyl thiuram disulfide takes place also by boiling the components for a longer period in a suitable diluent, e. g. chloroform.

The same compound is obtained as in Example 2.

Example 4

183 grams of p-aminophenyl arsine oxide are dissolved in 2 litres of 1 n-hydrochloric acid and 3 litres of water. With cooling and stirring 286 grams of sodium dimethyl dithiocarbamate dissolved in 5 litres of water are gradually added. After half an hour the milky reaction mixture is diluted with 10 litres of water, and the now flocky deposit is sucked off and washed. From acetone (by the addition of methanol to the filtrate) a white substance is obtained without definite melting point.

The above-described reaction takes the following course:

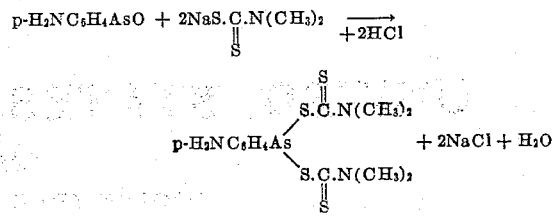

Example 5

To a solution of 80 grams of sodium hydroxide in 1.6 litres of water 170 grams of piperidine are added and 152 grams of carbon disulfide dropped in. By slightly heating the reaction is completed. Into the solution of the sodium N,N-pentamethylane dithiocarbamate thus obtained a solution of 106 grams of methyl arsine oxide dissolved in 900 cc. of water flows with good stirring. Thereafter 1 n-hydrochloric acid is added until the mixture shows a Congo acid reaction. The precipitate is sucked off and redissolved from alcohol. White needles are obtained of a melting point of 157° C.

The above-described reaction takes the following course:

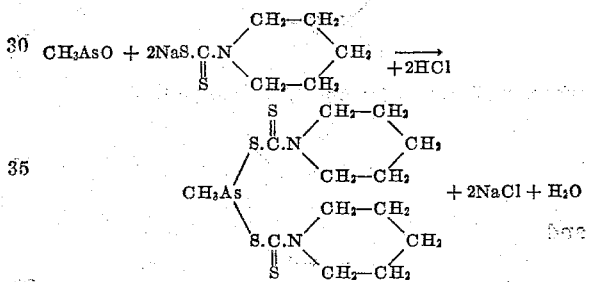

Example 6

By using 174 grams of morpholine instead of piperidine and reacting the sodium salt of the morpholine-4-dithiocarboxylic acid in the same way as described in Example 5, a condensation product is obtained which crystallizes from acetone in white needles and melts at 174° C.

The above-described reaction takes the following course:

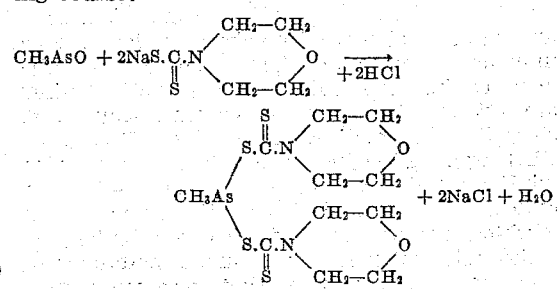

Example 7

80 grams of sodium hydroxide dissolved in 1.6 litres of water, 142 grams of pyrrolidine and 152 grams of carbon disulfide are reacted to form a solution containing sodium N,N-tetramethylene dithiocarbamate. By the addition of 106 grams of methyl arsine oxide dissolved in 900 cc. of water a yellow precipitate is obtained. By the addition of diluted hydrochloric acid until the mixture is acid to Congo red paper, the precipitate is increased and becomes white. After an hour's standing it is sucked off, washed with water and dried in the air. Melting point 176° C. A sample re-dissolved from alcohol yields white needles of a melting point of 178° C.

The above-described reaction takes the following course:

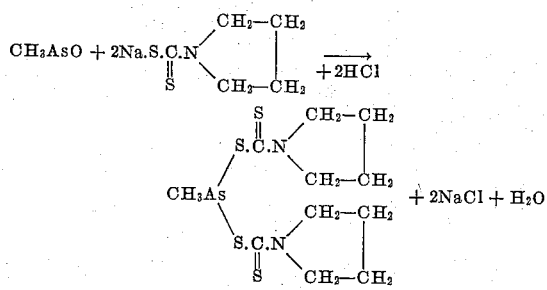

*Example 8*

To a solution of 13.1 grams of diphenylene arsine chloride in 130 cc. of acetone, a solution of 10 grams of sodium dimethyl dithiocarbamate dissolved in 100 cc. of acetone is added, and the mixture is boiled for one hour. After evaporating the solvent, the residue is diluted with water, the precipitate sucked off, washed with water and redissolved from acetone, melting point 142° C.

The above-described reaction takes the following course:

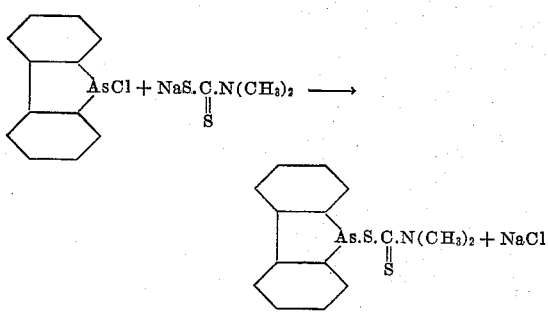

*Example 9*

41 grams of sodium phenyl methyl dithiocarbamate are dissolved in 500 cc. of water and added to 10.6 grams of methyl arsine oxide dissolved in 500 cc. of water. Without regard to a deposit formed hereby, 200 cc. of 1 n-hydrochloric acid are run into the mixture with stirring and inside cooling with ice. The mixture is then stirred for further 15 minutes, the precipitate is sucked off, washed with water and, after drying, re-dissolved from acetone or benzene. White crystals of a melting point of 191° C.

The above-described reaction takes the following course:

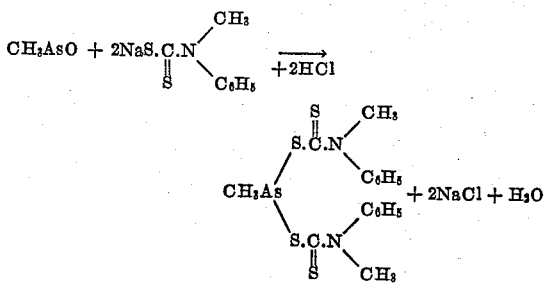

*Example 10*

Into a solution of 44 grams of ammonium dithiocarbamate in 1 litre of water 21.2 grams of methyl arsine oxide dissolved in 500 cc. of water are introduced, while adding ice and stirring. Immediately thereafter 400 cc. of 1 n-hydrochloric acid are added. After a short further stirring the white precipitate is isolated and re-dissolved from methanol in the usual manner. White crystalline substance which turns yellow at 130° C. and decomposes from about 138° C. with evolution of gas.

The above-described reaction takes the following course:

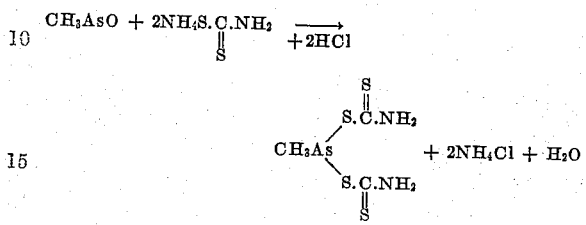

I claim:

1. Organic arsenical compounds of the general formula:

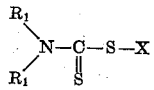

wherein X stands for a radical selected from the group consisting of:

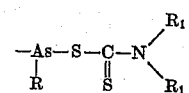

and

$R_1$ stands for a radical of the group consisting of hydrogen, alkyl, aryl, aralkyl, tetramethylene, pentamethylene, and —$CH_2.CH_2.O.CH_2.CH_2$—, both free valences of these divalent radicals being attached to the nitrogen atom, and R stands for a radical of the group consisting of alkyl, aryl, aralkyl, and

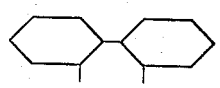

both free valences of this latter radical being attached to the arsenic atom.

2. The compound of the formula:

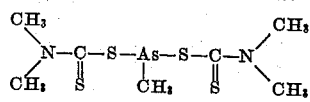

being a crystalline substance melting at 144° C.

3. The compound of the formula:

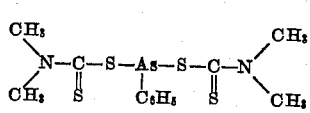

being a crystalline substance melting at 221° C.

EWALD URBSCHAT.

References Cited in the file of this patent

UNITED STATES PATENTS

| Number | Name | Date |
|---|---|---|
| 1,909,498 | Oechslin | May 16, 1933 |

OTHER REFERENCES

Cohen et al.: J. Chem. Soc. (London), 1931, p. 3043 to 3046.

Gazzetta Chimica Italiana, vol. 69, p. 633 to 635, 1939.